(12) United States Patent
Inoue

(10) Patent No.: US 6,609,752 B2
(45) Date of Patent: Aug. 26, 2003

(54) MOUNTING STRUCTURE FOR SEAT OCCUPANT SENSOR

(75) Inventor: Takashi Inoue, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/035,430

(22) Filed: Jan. 4, 2002

(65) Prior Publication Data
US 2002/0093236 A1 Jul. 18, 2002

(30) Foreign Application Priority Data

Jan. 12, 2001 (JP) ......................................... 2001-005549

(51) Int. Cl.[7] .............................. A47C 7/62; A47C 7/02; G08B 21/00
(52) U.S. Cl. ................................ 297/217.3; 297/452.6; 340/667; 200/85 A
(58) Field of Search ........................ 297/452.6, 180.12, 297/217.3; 340/667; 200/85 A; 5/424

(56) References Cited

U.S. PATENT DOCUMENTS

| | | | | |
|---|---|---|---|---|
| 3,649,974 A | * | 3/1972 | Baruth et al. .................. | 5/402 |
| 3,961,823 A | * | 6/1976 | Caudill, Jr. .............. | 297/452.6 |
| 5,120,980 A | * | 6/1992 | Fontaine .................... | 307/10.1 |
| 6,371,552 B1 | * | 4/2002 | Narita et al. ........... | 297/180.12 |
| 6,428,095 B1 | * | 8/2002 | Hirata ..................... | 297/217.3 |

FOREIGN PATENT DOCUMENTS

EP 280148 A1 * 8/1988 ........... A47C/31/02

* cited by examiner

Primary Examiner—Peter M. Cuomo
Assistant Examiner—Sarah C. Burnham
(74) Attorney, Agent, or Firm—Posz & Bethards, PLC

(57) ABSTRACT

In a mounting structure, a seat occupant sensor is disposed on the central region of the bearing surface of the foam of a seat, and signal lines that connect the sensor to an ECU cross a groove formed on foam. Deeper portions are formed on the bottom of the groove so as to correspond to the portions of the groove where the signal lines cross the groove. Further the portions of a wire buried in the foam corresponding to the deeper portions are routed so that the wire bypasses the deeper portion. According to this arrangement, the signal lines can move freely in the deeper portion of the groove, and therefore the signal lines are immune to breaking even if the foam deforms. Thus the reliability and the durability of the seat occupant sensor are ensured.

9 Claims, 4 Drawing Sheets

MOUNTING STRUCTURE FOR SEAT OCCUPANT SENSOR

CROSS REFERENCE TO RELATED APPLICATION

The present application is based on and incorporates herein by reference Japanese Patent Application No. 2001-5549 filed on Jan. 12, 2001.

BACKGROUND OF THE INVENTION

1. Field of the Invention

The present invention relates to a mounting structure for incorporating a seat occupant sensor in a seat of a vehicle.

2. Related Art

It is known that a seat occupant sensor is incorporated in a seat of a vehicle for detecting whether an occupant is present on the seat and, if any, whether the occupant is an adult or a child. The seat occupant sensor is arranged between the foam and the trim of the seat, and includes a plurality of sensor cells printed on a film. The sensor cells are connected to an ECU via signal lines also printed on the film.

Since a groove for fastening the trim is formed on the foam and the ECU is installed on the rear end portion of the foam, the signal lines that connect between the sensor cells and the ECU must cross the groove. Then, referring to FIG. 6, it is proposed that a portion of the groove 110 where the signal line 100 crosses the groove 110 is filled up. However, the trim 130 cannot be pulled into the filled portion of the groove 110, and therefore the portion of the trim 130 corresponding to the filled portion of the groove 110 will get wrinkled. Further the filled portion of the groove 110 limits the design of the seat.

Moreover, referring to FIG. 7, it is proposed that the signal lines 100 pass under a wire 120 that passes through the groove 110. However in this case, when the foam 140 deforms, the film may jackknife and consequently the signal line 100 may be broken, because the film cannot move freely in the groove 110. Accordingly the reliability and the durability of the seat occupant sensor are not ensured in this case.

SUMMARY OF THE INVENTION

The present invention has an object to provide a mounting structure for incorporating a seat occupant sensor in a seat so that the reliability and the durability of the sensor are ensured and the design of the seat is not spoiled.

According to the present invention, a mounting structure for a seat occupant sensor includes a seat and the seat occupant sensor. The seat includes foam and trim that covers the foam. The seat occupant sensor is disposed between the foam and the trim of the seat for detecting load on the seat, and a signal line is connected to the seat occupant sensor. A groove is formed on the foam, and a first wire attached to the trim passes through the groove. Further a second wire is buried in the foam so as to run along and under the groove. The signal line falls down and thereafter goes up along the inner wall of the groove so as to cross the groove, and the turning-back portion of the signal line passes under the first wire.

A deeper portion is formed on the bottom of the groove so as to correspond to the portion of the groove where the signal line crosses the groove. Further the second wire is removed from the deeper portion so that the turning-back portion of the signal line can move freely in the deeper portion.

Preferably, the portion of the second wire corresponding to the deeper portion is routed so that the second wire bypasses the deeper portion. Alternatively, the portion of the second wire corresponding to the deeper portion may be cut off.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
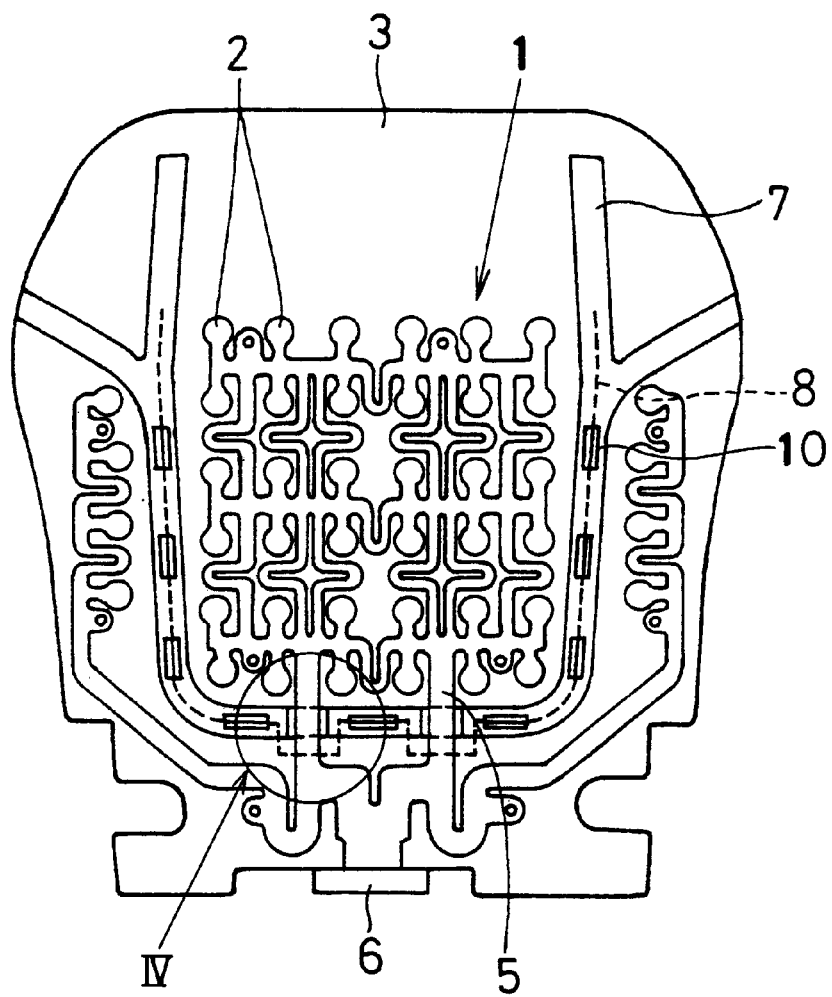
FIG. 1 is a plan view of a seat occupant sensor disposed on the foam of a seat and a mounting structure therefor according to an embodiment of the present invention.
Figure 2:
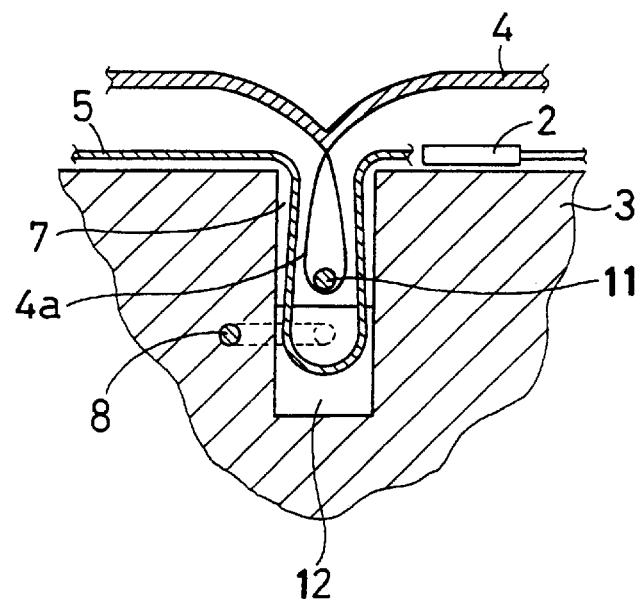
FIG. 2 is a cross-sectional view of a portion of the mounting structure where signal lines connected to the seat occupant sensor cross a groove formed on the foam.

Referring to FIGS. 1 and 2, a seat occupant sensor 1 includes a plurality of sensor cells 2 disposed on the central region of the bearing surface of the foam (polyurethane foam) 3 of a seat. The sensor cells 2 are arranged coplanarly between the foam 3 and the trim 4 that covers the form 3. The sensor cells 2 are connected to an electronic control unit (ECU) 6, which is disposed in the rear end portion of the foam 3 and includes a microcomputer, by signal lines 5. The sensor cells 2 and the signal lines 5 are printed on a film (e.g., PEN film).

The foam 3 forms the entire shape of the seat, and a groove 7 for fastening the trim 4 is formed on the foam 3. The groove 7 runs along the designed portion of the trim 4 so as to form generally a U-shape. A wire 8 is buried in the foam 3 so as to run along and under the groove 7. Hanging bag 4a is sewed on the reverse side of the trim 4 so as to run along the designed portion of the trim 4. Another wire 11 passes through the hanging bag 4a.

Figure 3:
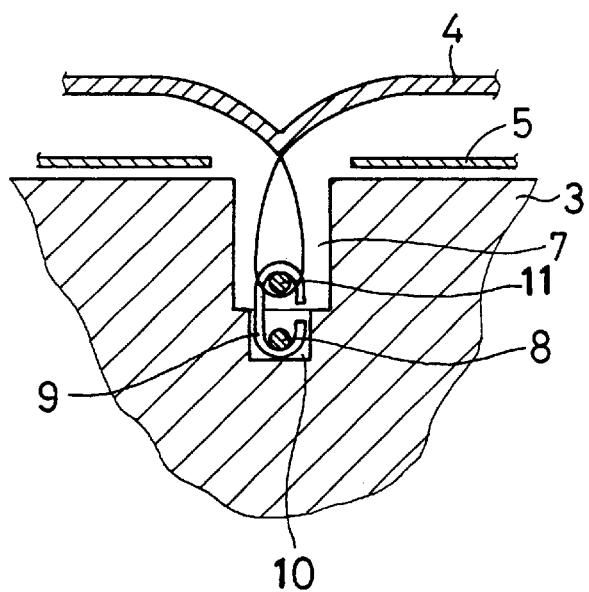
FIG. 3 is a cross-sectional view of a portion of the mounting structure where a wire attached to the trim of the seat is fixed to another wire buried in the foam by a C-ring.
Figure 4:
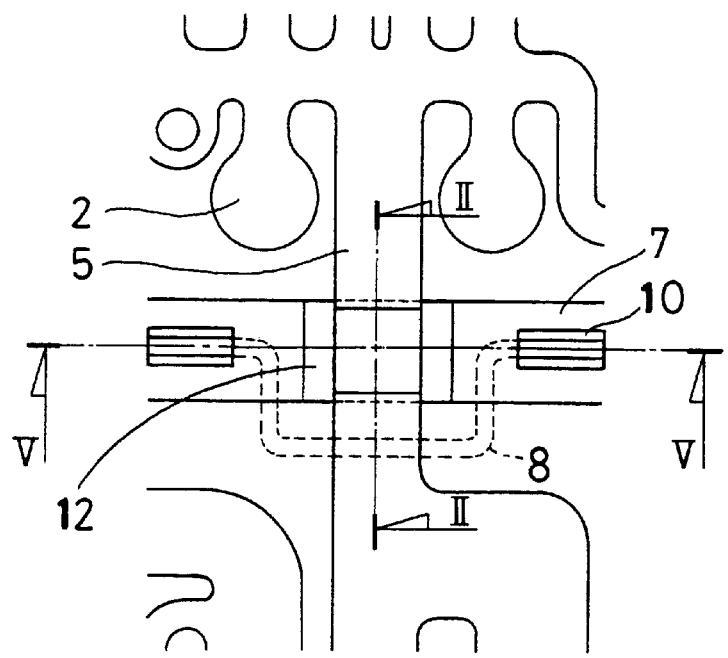
FIG. 4 is an enlarged plan view of the portion of the mounting structure where the signal lines connected to the seat occupant sensor cross the groove formed on the foam.

Referring to FIG. 3, a plurality of recesses 10 are formed on the bottom of the groove 7 so that the corresponding portions of the wire 8 are exposed. The wire 11 attached to the trim 4 is fixed to the exposed portions of the buried wire 8 by C-rings 9. Thus the trim 4 is fastened to the foam 3.

Figure 5:
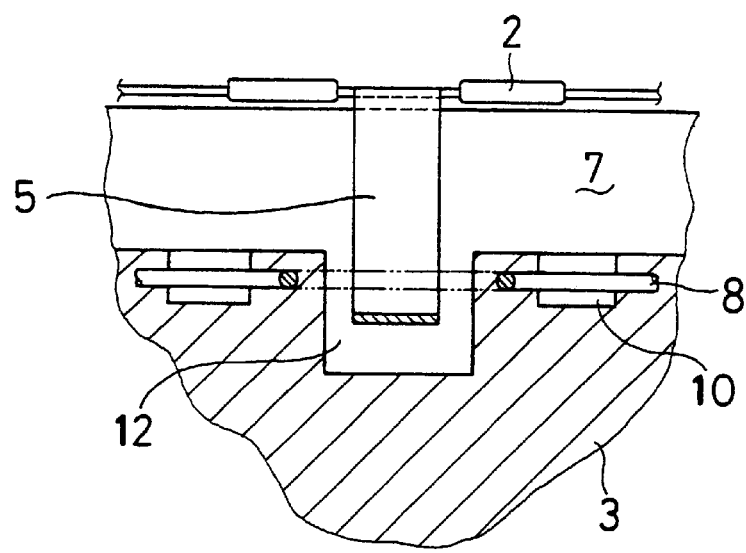
FIG. 5 is a cross-sectional view of FIG. 4 taken along the line V—V.
Figure 6:
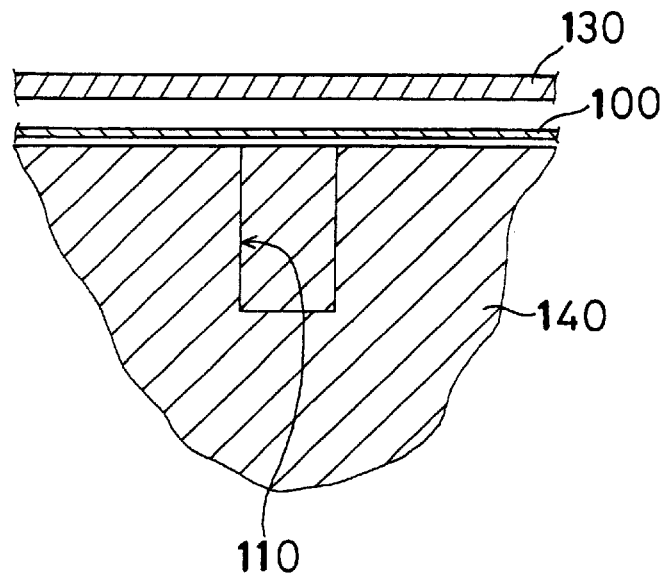
FIG. 6 is a cross-sectional view of a mounting structure for a seat occupant sensor according to related art.
Figure 7:
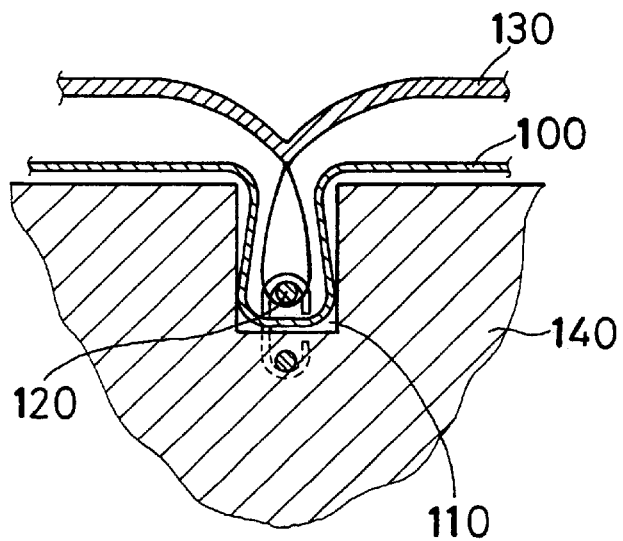
FIG. 7 is a cross-sectional view of another mounting structure for a seat occupant sensor according to related art.

The signal lines 5 must cross the groove 7, because they connect the sensor cells 2 disposed on the center region of the foam 3 to the ECU 6 disposed on the rear end portion of the foam 3. Referring to FIGS. 1, 2, and 5, deeper portions 12 are formed on the bottom of the groove 7 so as to correspond to the portions of the groove 7 where the signal lines 5 cross the groove 7. Further the buried wire 8 is routed so as to bypass the deeper portions 12. That is, the buried wire 8 passes by the deeper portions 12 as shown in FIGS.

2 and 4. Alternatively, the buried wire 8 may pass under the deeper portions 12.

In the portions of the groove 7 where the signal lines 5 cross the groove 7, the signal lines 5 are routed along the inner walls of the groove 7 and the deeper portion 12, and pass under the wire 11 attached to the trim 4. Then the signal lines 5 follow the inner walls of the deeper portion 12 and the groove 7 out of the groove 7 as shown in FIG. 2.

According to the present embodiment, the signal lines 5 are not sandwiched in between the buried wire 8 and the wire 11 attached to the trim 4, because the buried wire 8 bypasses the deeper portions 12. Therefore the signal lines 5 do not interfere with the wires 8, 11 even if the foam 3 deforms.

Further the signal lines 5 do not turn along the side inner walls and the bottom surface of the groove 7, because gap is formed between the signal lines 5 and the walls of the deeper portions 12. Therefore, the signal lines 5 do not jackknife even when the foam 3 deforms, because the signal lines 5 are immune to stress and can move freely in the deeper portions 12 of the groove 7. Accordingly, the signal lines 5 are immune to breaking, and therefore the reliability and the durability of the seat occupant sensor 1 are ensured.

Moreover, according to the present embodiment, the design of the seat is not spoiled and further the trim 4 of the seat does not get wrinkled, because the portions of the groove 7 where the signal lines 5 cross the groove 7 are not filled up.

(Modifications)

In the above embodiment, the buried wire 8 is routed so as to bypass the deeper portions 12. However, the portions of the buried wire 8 corresponding to the deeper portions 12 may be cut off so as not to pass through the deeper portions 12.

The mounting structure according to the present embodiment may be used for incorporating a device other than the seat occupant sensor 1 in the seat. For example, it may be used for incorporating a seat heater in the seat for heating the bearing surface of the seat.

What is claimed is:

1. A mounting structure for a seat occupant sensor comprising:
   a seat including foam and trim that covers said foam;
   said seat occupant sensor being located between said foam and said trim for detecting a load on said seat;
   a signal line connected to said seat occupant sensor;
   a first wire attached to said trim; and
   a second wire buried in said foam,
   wherein a groove is formed on said foam, and said signal line is routed to cross said groove,
   wherein said first wire passes through said groove and said second wire runs along and under said groove,
   wherein said signal line is routed along both inner side walls of said groove to turn back under said first wire in a portion of said groove where said signal line crosses said groove,
   wherein a plurality of deeper portions are formed on a bottom of said groove for housing said signal line, and
   wherein said second wire lies outside said deeper portions.

2. A mounting structure as in claim 1,
   wherein a portion of said second wire corresponding to said deeper portion is routed so that said second wire bypasses said deeper portion.

3. A mounting structure as in claim 1,
   wherein a portion of said second wire corresponding to said deeper portion is cut off.

4. A mounting structure comprising:
   a seat including foam and trim that covers said foam;
   a device located between said foam and said trim;
   a signal line connected to said device;
   a first wire attached to said trim; and
   a second wire buried in said foam,
   wherein a groove is formed on said foam, and said signal line is routed to cross said groove,
   wherein said first wire passes through said groove and said second wire runs along and under said groove,
   wherein said signal line is routed along both inner side walls of said groove to turn back under said first wire in a portion of said groove where said signal line crosses said groove,
   wherein a plurality of deeper portions are formed on a bottom of said groove for housing said signal line, and
   wherein said second wire ties outside said deeper portions.

5. A mounting structure as in claim 4,
   wherein a portion of said second wire corresponding to said deeper portion is routed so that said second wire bypasses said deeper portion.

6. A mounting structure as in claim 4,
   wherein a portion of said second wire corresponding to said deeper portion is cut off.

7. A mounting structure for a seat occupant sensor comprising:
   a seat including foam and trim that covers the foam, wherein the foam defines a groove and the seat occupant sensor is located between the foam and the trim for detecting load on the seat;
   a first wire that is attached to the trim and that passes through the groove;
   a second wire that is buried in the foam and that runs along and under the groove;
   a signal line that is connected to the seat occupant sensor and that crosses the groove, wherein the signal line is routed long the inner side walls of the groove and under the first wire in a portion of the groove where he signal line crosses the groove; and
   a deeper portion formed a bottom of the groove corresponding to the portion of the groove where the signal line crosses the groove.

8. A mounting structure as in claim 7, wherein the second wire is routed to bypass the deeper portion.

9. A mounting structure as in claim 7, wherein the second wire is cut off at the deeper portion.

* * * * *